(12) United States Patent
Grimm

(10) Patent No.: US 6,311,830 B1
(45) Date of Patent: Nov. 6, 2001

(54) POCKET FOR CONVEYOR BELT ALLOWING PIVOTAL MOVEMENT OF AN ARTICLE HELD THEREIN

(75) Inventor: Robert W. Grimm, Carol Stream, IL (US)

(73) Assignee: Machine Tool Technology 21-Inc., Schaumburg, IL (US)

(*) Notice: Subject to any disclaimer, the term of this patent is extended or adjusted under 35 U.S.C. 154(b) by 0 days.

(21) Appl. No.: 09/414,105

(22) Filed: Oct. 7, 1999

(51) Int. Cl.[7] .................................................... B65G 29/00
(52) U.S. Cl. .................................. 198/477.1; 198/803.14
(58) Field of Search ........................... 198/477.1, 803.14, 198/346.2, 468.2

(56) References Cited

U.S. PATENT DOCUMENTS

| | | | |
|---|---|---|---|
| 3,568,851 | * 3/1971 | Schafer | 198/803.14 |
| 4,244,458 | 1/1981 | Kampf . | |
| 4,359,155 | 11/1982 | Brazeal . | |
| 4,475,645 | * 10/1984 | Young | 198/803.14 |
| 4,781,285 | 11/1988 | Schlatter et al. . | |
| 4,907,504 | 3/1990 | Harris . | |
| 4,991,707 | 2/1991 | Alexander et al. . | |
| 5,141,093 | 8/1992 | Alexander . | |
| 5,147,026 | 9/1992 | Scaglia . | |
| 5,330,043 | * 7/1994 | Stuckey | 198/346.2 |
| 5,484,052 | * 1/1996 | Pawloski et al. | 198/803.14 |
| 5,653,014 | 8/1997 | Faraoni et al. . | |
| 5,749,383 | 5/1998 | Parslow, Jr. . | |
| 5,769,203 | * 6/1998 | Sala | 198/803.14 |

* cited by examiner

Primary Examiner—Kenneth W. Noland
(74) Attorney, Agent, or Firm—Young & Basile, P.C.

(57) ABSTRACT

A conveyor system for transporting elongate articles along a conveying surface to a workstation. The conveying surface forms an endless path having an upper conveying path and a lower return path. The conveying surface has article holders fixedly connected on the conveying surface for holding the elongated articles on the conveying surface with longitudinally extending sides of the article essentially extending outwardly from the conveying surface. A gripping device is positioned adjacent the conveying surface and pivots about an axis for unloading and loading the article to and from the conveying surface in a single pivotal motion. A first article holder type includes a pair of arcuate portions positioned to form a discontinuous cylindrical configuration having open areas between each end of the arcuate portions and an upper lip for receiving a complementary groove in the elongate article. The open areas provide access for releasing the article from the article holder when the gripping device pivots away from the article holder. Another article holder type includes a pivoting holder that pivots at least a portion of the article holder and supported article toward the direction of the gripping device when the gripping device pivots away from the article holder.

19 Claims, 3 Drawing Sheets

POCKET FOR CONVEYOR BELT ALLOWING PIVOTAL MOVEMENT OF AN ARTICLE HELD THEREIN

FIELD OF THE INVENTION

This invention relates to a pocket for holding an elongate article by one of the lateral ends on a conveyor and to provide discharge of the elongate article from the conveyor.

BACKGROUND OF THE INVENTION

During the manufacturing of certain products, the articles being processed may be transported from one delivery point or workstation to another workstation along a horizontal conveyor. In instances where the article is an elongated part, the article is generally laid on the conveyor in a horizontal position such that a longitudinally extending side of the article contacts the conveyor surface. When the article reaches the workstation, a transfer device or lifter is generally required to move the article from the conveyor and reorientate the article for proper alignment and processing at the workstation.

In some instances it is necessary to maintain the article on one lateral end so that a longitudinally extending side extends outwardly from the conveyor. In addition, some of these articles are not compatible with conventional gravity loaders or pallet stacker loaders. In these cases, a transfer device or lifter is again required to move the elongated article in the vertical direction away from the conveyor before moving the article horizontally toward the workstation. In both cases, the transfer device or lifter will employ a cylinder and piston mechanism to activate the movement of the transfer device or lifter.

It is therefore desirable to provide a holding means on the conveyor that is configured to hold an article by one lateral end and also allowing a gripper tool to unload the article from the holding means with a pivoting movement only. As a result, the cylinder and piston mechanism can be eliminated. It is further desirable to provide an article holding means for a conveyor that is cost effective and easily secured to the conveyor. It is also desirable to provide an article holder that is configured to not distort or be damaged by continuous angular unloading of the article.

SUMMARY OF THE INVENTION

The present invention addresses the aforementioned concerns by providing a conveying system for transporting individual elongated articles having lateral ends from a first position to a second position. The conveying system also provides an article holding means for releasable securing the individual elongated articles by one of the lateral ends to the conveyor path. The conveying system may also include a conveyor gripper for removing the article individually in a single pivotal motion away from the conveying surface.

The present invention provides a conveying surface including a pocket for each article. The pockets are fixedly connected to the surface of the conveyor. The pockets have a complementary configuration portion for securely receiving the articles.

In one embodiment of the pocket, a pair of arcuate portions extend above a base which is fixedly connected to the conveyor surface. The arcuate portions are positioned in a discontinuous cylindrical configuration thereby providing open spaces between the arcuate portions. The open spaces provide access for releasing the article from the article holder to the article gripper.

In another embodiment the pocket may include a base fixedly connected to the conveyor surface. The pocket may have one end pivotally connected to the base. The pocket is preferably biased to return to the base against the surface of the conveyor. The pivoting feature of the pocket allows the article to be angularly removed from the pocket by the conveyor gripper.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
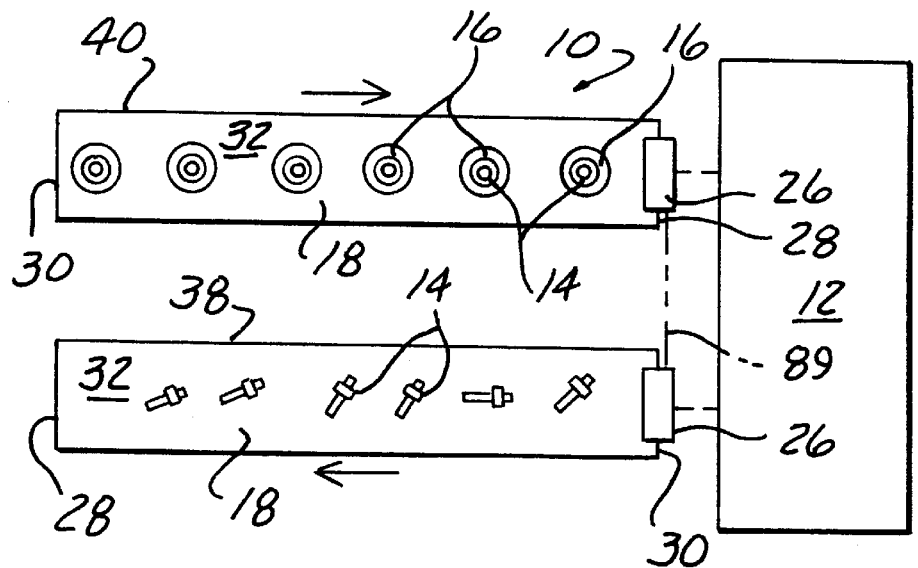
FIG. 1 is a schematic plan view of a conveyor transport system to and from a manufacturing machine.
Figure 2:
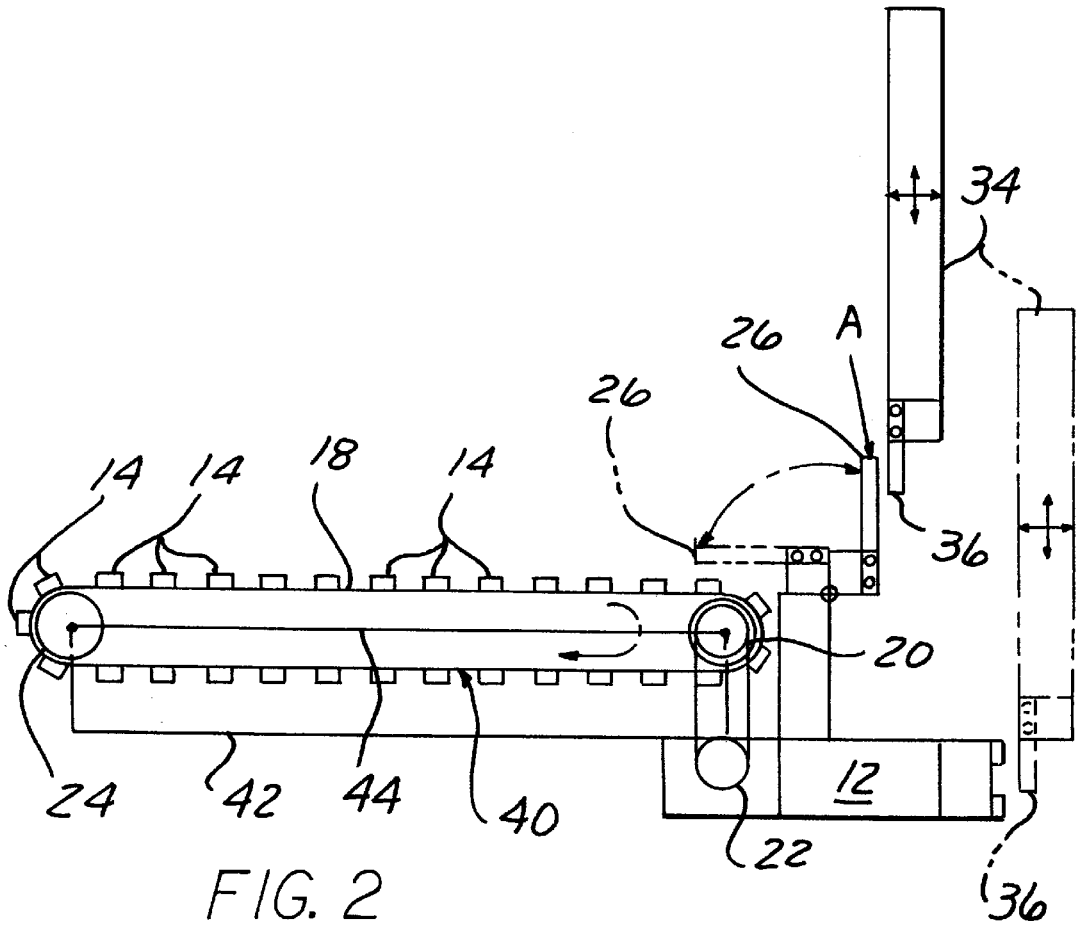
FIG. 2 is a schematic side view having a conveyor for transporting articles to the manufacturing machine, wherein the conveyor is equipped with pockets according to the present invention.

FIGS. 1–5 show a system and a support for transporting elongated articles having longitudinal sides and lateral ends in a conveyor system 10 to or from a manufacturing machine 12 or system such that the articles 14 are supported within pockets 16. Each pocket 16 holds a single article 14 by one of the lateral ends to keep the articles 14 from falling off the conveyor 10 or physically jamming between the transfer from the linear conveyor to the manufacturing machine 12 or system. The linear conveyor system 10 incorporating the pockets 16 along the conveyor 10 is designed for articles 14 that cannot be transported in the conventional gantry loaders or pallet stacker loaders. One such system is illustrated in FIGS. 1 and 2. A conveyor belt 18 moves horizontally around two end sprockets. The primary sprocket 20 is secured to a drive 22 member for rotation. The opposing sprocket 24 is a slave to the primary sprocket 20. Custom made pockets 16 are secured to the belt 18 of the conveyor 10 to hold specific articles 14 in a vertically extending direction. The pockets 16 are positioned and evenly spaced along the horizontal path of the conveyor for incremental pickup by conveyor grippers 26. In the illustrated conveying system 10 the conveyor grippers 26 are positioned proximate to the discharge end 28 of the conveying path 32, although other positions along the conveying path 32 are possible, such as the delivery end 30 or any position therebetween.

Figure 4:
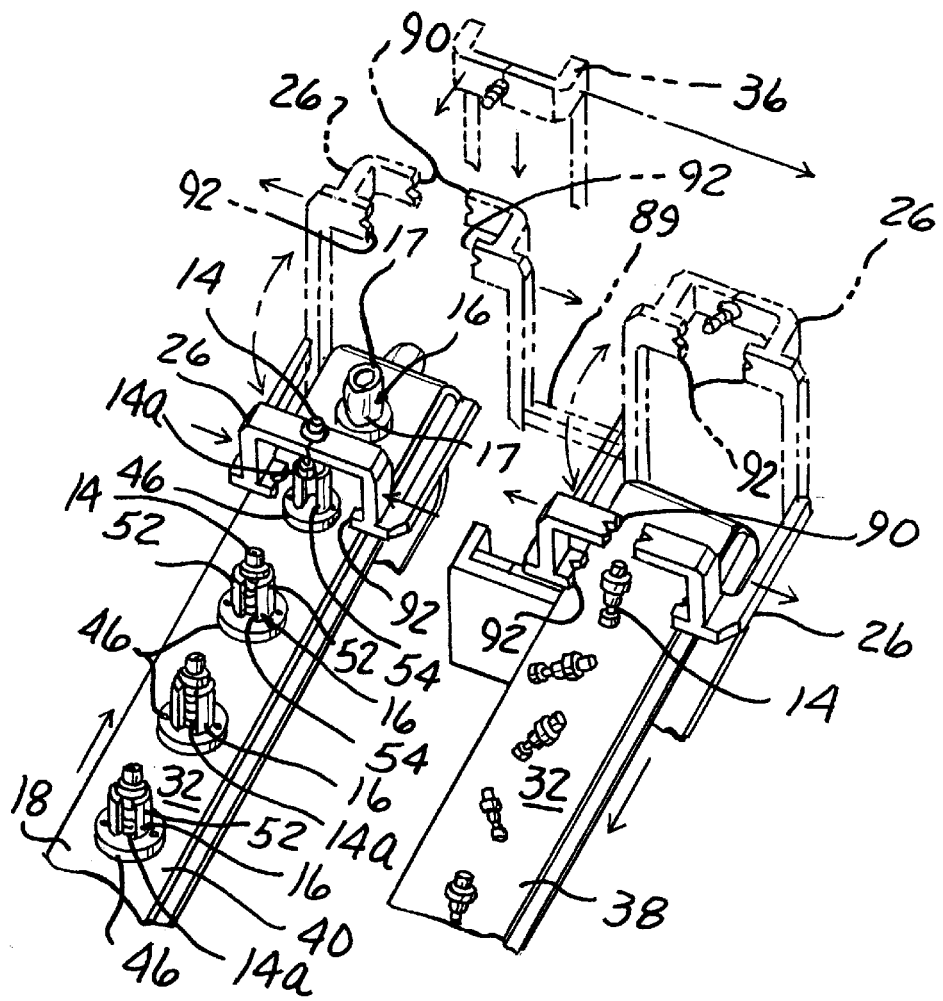
FIG. 4 is a perspective view, with certain parts broken away or shown in section of a portion of the conveyor transport system having the pockets of the first embodiment at a discharge end to the manufacturing machine as a conveyor gripper removes an article from one of the pockets.
Figure 6:
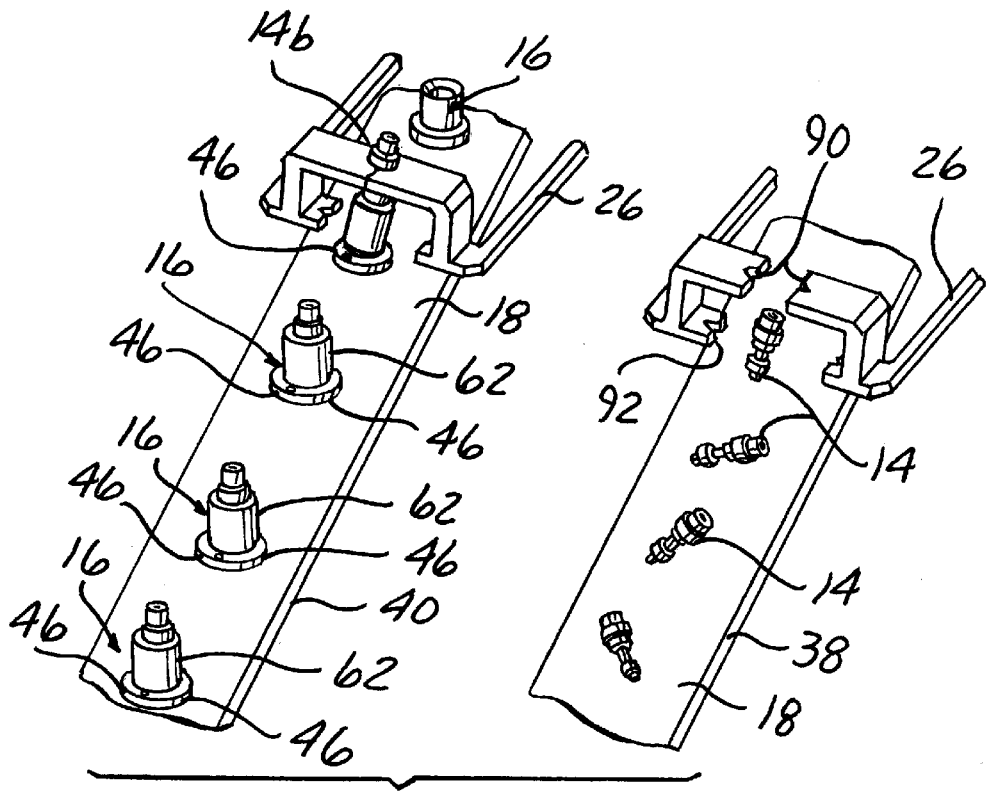
FIG. 6 is a perspective view with certain parts broken away or shown in section of a portion of the conveyor transport system having the pockets of the second embodiment at the discharge end to the manufacturing machine as the conveyor gripper removes an article from one of the pockets.

A separate conveyor gripper 26 is used for each conveyor. The conveyor grippers 26 move synchronously in a pivotal manner approximately 90° adjacent to the conveying path 32. In FIGS. 2, 4 and 6, the conveyor grippers 26 are shown proximate to the discharge end 28 for material approaching the manufacturing machine 12 and at the delivery end in both FIGS. 4 and 6 for finished material leaving the manufacturing machine 12. Looking again at FIG. 2, the conveyor grippers 26 move in a pivotal fashion from a horizontal position (shown in phantom) over the conveyor path 32 to a vertical position. The movement of the conveyor grippers to a horizontal position coincide with the positioning of a pocket at the pick-up location. When the conveyor grippers 26 are in the horizontal position, and an elongated article 14 is within a pocket 16 at the pick-up location under the gripper 26, the article 14 is secured by the conveyor grippers 26 and pivotally removed from the pocket 16. The article 14 is pivotally moved to and held in a horizontal position at position A, for transfer to the manufacturing machine 12.

The manufacturing machine 12 as illustrated in FIGS. 1 and 2, include a gantry 34 having associated gantry grippers 36 for transporting the article 14 from the conveyor grippers 26 to the machine 12. Preferably a high speed gantry loader 34 is provided to allow horizontal and vertical movement of the gantry grippers 36 for retrieving the article 14 from the conveyor grippers 26 to position the article 14 at the manufacturing machine 12. The gantry gripper 36 then removes the article 14 from the manufacturing machine 12 and transfers the finished article to a second unit of conveyor grippers 26. The second unit of conveyor grippers 26 then pivotally deposits the finished article 14 on the return conveyor 38. The return conveyor 38 may optionally include pockets 16 in which to deposit the finished articles 14. A typical manufacturing machine that can use a conveying system as disclosed in the present invention is a lathe 12 for finishing and drilling an elongated article 14 such as a poppet valve.

Hereinafter the discussion will pertain to the delivery conveyor 40, which delivers articles 14 to the manufacturing machine 12. The same description may be afforded also to the return conveyor 38 which conveys a finished article 14 from the manufacturing machine to a discharge and packing area, or conveys the article 14 to another manufacturing machine 12. In the illustrated embodiments, the return conveyor carries the articles 14 resting on the longitudinal sides of the article 14 without the use of the pockets.

In order to convey the articles 14 along conveyor path 32, the conveyor provides a frame 42 which supports a conveyor bed defining the conveying path 32. The conveyor belt 18 provides a surface 44 on the conveyor path and is supported and driven at the ends of the conveying path by a pair of similar sprockets 20, 24 that are mounted on lateral axis 44 supported by the frame 42. The sprockets 20, 24 engage the belt 18 and guide the belt 18 when rotating between the upper conveyor path and the lower return path. The driving means is provided by a motor 22 that is coupled with the primary sprocket 20 in order to power the rotation of the sprockets and drive the conveyor belt 18 along the continuous predetermined path.

In order to secure the articles 14 in an upright manner as shown in FIGS. 4 and 6 when conveyed along the path, the article holder uses pockets 16 that are secured directly to the conveyor belt 18 by extending conventional fasteners through the base 46 of the pockets and through the belt 18. The pockets 16 are spaced a predetermined distance from one another to provide incremental spacing for the conveyor grippers 26 when retrieving an article 14 from the pocket 16.

Figure 3A:
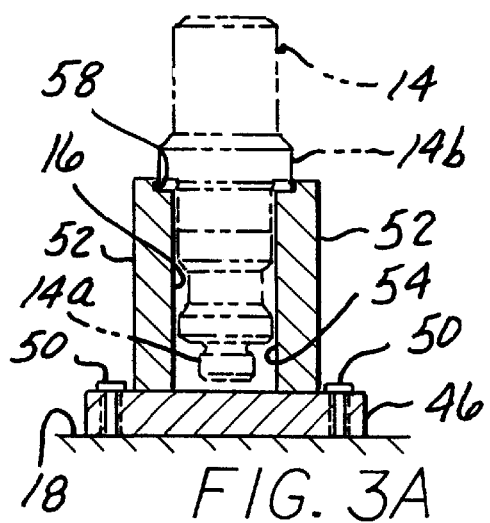
FIG. 3A is side elevational view of a first embodiment of a pocket, according to the present invention showing a typical article shown in phantom therein.
Figure 3B:
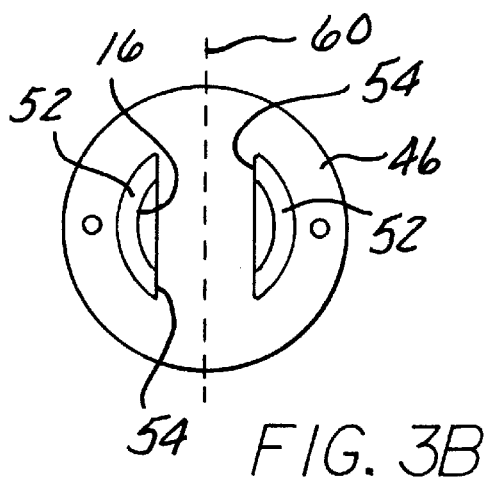
FIG. 3B is a top view of the pocket shown in FIG. 3A.

A first embodiment for a pocket shown in FIGS. 3A, 3B, and 4 includes a circular or square planar base 46 having apertures adjacent opposite edges for inserting conventional fasteners 50 therein through the base 46 and belt 18. Extending upperwardly from the base 46 are a pair of arcuate portions 52 fixedly secured on the base 46 to form a discontinuous cylindrical pocket 16 having a pair of open spaces 54 between the pair of arcuate portions 52. The inner peripheral top edge 56 has a groove 58 for receiving a portion of the article 14 thereon. Each pocket 16 can be custom made for the individual article configuration and therefore each pocket 16 has surface portions that complement at least some of the exterior surface portions of the article 14. The pocket 16 is positioned and secured on the conveying belt 18 such that the diametric axis 60 which goes through the center of the pair of open spaces 54 and center of the base are aligned in the direction of the conveyor grippers 26.

The pockets 16 are positioned on the belt 18 so that when the article 14 is being removed from the pocket 16 by the conveyor gripper 26 in a pivotal movement, the bottom portion 14a of the articles 14 partially enclosed by the arcuate portions 52, which define the pocket 16, will be allowed to angularly unload from the pocket and extend beyond the circular boundaries of the arcuate portions 54 through the open space 54 as shown in FIG. 4. It would also be possible to configure the pocket 16 of the first embodiment to include expanded portions 17 where the open spaces 54 are located, to allow the article 14 pivotal movement and still enclose the entire bottom portion 14a of the article 14 within the pocket 16. In otherwords, the pocket 16 would have an essentially oval configuration rather than a circular configuration. The pocket is positioned and secured to the conveying belt 18 such that the axis through the expanded portions 17 is aligned in the direction of the conveyor grippers 26.

Figure 5A:
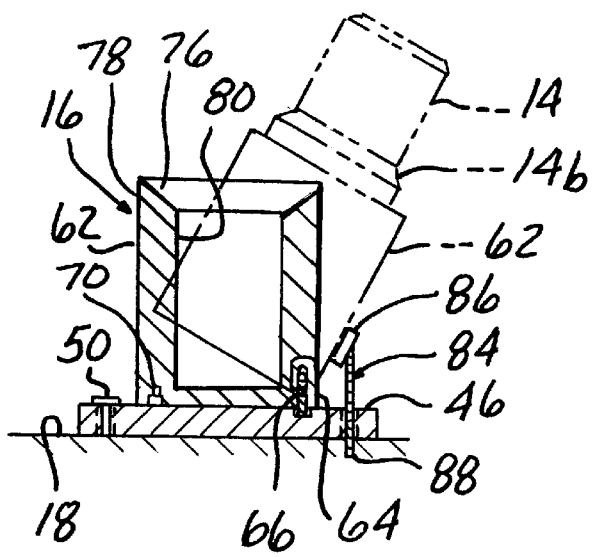
FIG. 5A is side elevational view of a second embodiment of the pocket where the pocket is pivotally hinged on a base as shown in phantom.
Figure 5B:
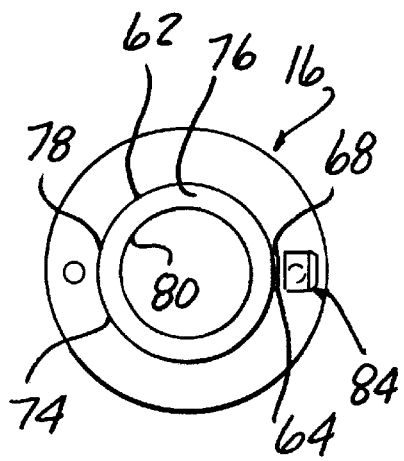
FIG. 5B is a top view of the pocket shown in FIG. 5A.

In another embodiment as shown in FIGS. 5A, 5B, and 6, a flexible or pivoting pocket is provided. The pivoting pocket 16 includes a base 46 for securing onto the conveyor belt 18 and a cylindrical member 62 extending upwardly from the base 46. The base 46 is similar to the base in the first embodiment and has apertures adjacent opposite edges for inserting conventional fasteners 50 therein to secure the base 46 to belt 18. One edge 64 of the cylindrical member 62 is pivotally connected to the base 46. A spring 66 is connected to a pivoting shaft 68 to bias the pocket 16 to an upright position relative to the conveyor belt 18. On the diametrically opposing edge 74 of the cylindrical member 62 from the pivoting edge 64 there may be an adjustment screw 70 which adjusts the return pivot of the pocket 16 against the conveyor belt 18. The adjustment screw 70 has an accessible head 72 from the bottom surface of the cylindrical member 62 which can be turned to adjust the height of the opposing edge 74. The top circumferential edge of the cylindrical member 62 has a beveled edge 76 having a higher edge along the outer periphery 78 and a lower edge along the inner periphery 80. The inside diameter of the interior of the cylindrical member 62 is dimensioned to support the elongated article 14 in a vertical or upright direction relative to a horizontally extending conveying path 32. In addition, either the base 46 of the pocket 16 or the conveyor belt 18 itself may include a stopper 84 positioned adjacent to the pivoting edge of pocket 16. The stopper 84 may include an elevated bumper 86. The bumper 86 may be angularly set on a shaft 88 and positioned at a predetermined position to restrict the angular pivoting movement of the pocket 16.

As shown in FIG. 6, by way of example and not limitation, the pivoting pocket 16 is positioned on the conveyor belt 18 such that the pivoting edge 64 and diametrically opposing edge having the adjustment screw form an axis parallel to conveying path 32. The pocket is further positioned such that the pivoting edge 64 is positioned closer to the conveyor grippers 26 than the adjustment screw 70. The stopper 84 is positioned closer to the conveyor grippers 26 than the pivoting edge 64 of the associated pocket 16. When the pocket 16 arrives at the discharge end 28, the conveyor grippers 26 are positioned horizontally over the conveying path 32 so that the conveyor gripper 26 can engage the article 14 located at the pick-up location. As shown in FIG. 6, as the conveyor gripper 26 pivotally raises the article 14 from the pocket 16, the pocket 16 pivots in the direction of the conveyor gripper 26 to allow angular unloading of the article 14. The beveled edge 76 further facilitates the angular unloading of the article 14 from the pocket. The stopper 84 limits the pivot of the pocket, and the spring 66 biases the pocket to its original position on the conveyor belt 18 after the article 14 has been removed from the pocket.

It is envisioned that a pocket 16 according to the present invention can include a stationary, upright, partial, cylindrical portion and a flexible or pivotable, upright, partial cylindrical portion which allows movement of at least a portion of the pocket 16 toward the grippers 26 as the article 14 is removed. The flexible or pivotable portion may include a resilient material capable of bending under pressure with sufficient memory to return to an original upright orientation after release of the pressure imposed during removal of the article 14.

In FIGS. 1, 4, and 6 a pair of conveyor grippers 26 are shown. There is one conveyor gripper 26 for each associated conveying path 32. If the conveyor system 10 includes a pair of conveying paths 32, then the conveyor grippers 26 could be synchronized to move in unison if desired. The conveyor grippers 26 are mounted on an axis 89 which is actuated by a controller (not shown) to move the conveyor grippers 26 horizontally over the conveying path 32 when a pocket 16 has reached the predetermined pick-up location. In the illustrated embodiment, when a pocket 16 reaches the discharge end 28, the conveyor gripper 26 is actuated to pivotally move horizontally over that pocket 16. The conveyor gripper 26 includes jaws 90 which are movable between an open position and closed position. The controller controls the action of the jaws 90 to close around an exposed portion 14b of the article 14 in the pocket 16. In the illustrated embodiment shown in FIGS. 4 and 6, the conveyor grippers 26 may include a secondary set of jaws 92 having a closed position which accommodates larger articles.

As one conveyor gripper 26 over the delivery conveyor 40, is picking up an article 14 from a pocket 16, the second conveyor gripper 26 over the return conveyor 38 may be actuated to release a finished article 14 onto the return conveyor 38. The conveyor grippers 26 pivot from a horizontal position to a vertical position in an arcuate motion as shown in FIG. 2. The arcuate motion in the illustrated embodiment has a radius of 153 mm to provide adequate clearance of the conveyor gripper 26 for the article 14 and the associated pocket 16. When the conveyor grippers 26 are in the vertical position as shown in FIG. 2 and in phantom in FIG. 4, the article 14 held in the grippers 26 are positioned horizontally. When the conveyor grippers 26 are in the vertical position the article in the grippers jaws are accessible to gantry grippers 36.

The gantry grippers 36 are configured similarly to the conveyor grippers 26. In the illustrated embodiment a pair of gantry grippers are provided such that one gantry gripper 36 can receive an article 14 from the conveyor gripper at the delivery conveyor 40 and another gantry gripper 36 can release a finished article to the conveyor gripper 26 of the return conveyor 38. The gantry grippers 36 are attached to a high speed gantry loader 34. The high speed gantry loader 34 provides vertical as well as horizontal movement of the gantry grippers 36. The gantry loader 34 moves the gantry grippers 36 and the associated article 14 from the conveyor system 10 to the manufacturing machine 12 for finishing; and then moves the article 14 back to the conveyor system 10 for packaging or further assembly. The gantry grippers 36 are attached to a turntable that provides 90° movement of the grippers to accommodate positioning one of the gantry grippers 36 in line of the manufacturing machine 12 for releasing and retrieving an article 14 therefrom.

In operation, elongated articles such as poppet valves 14 are inserted into individual pockets along the delivery conveying path 32 of the delivery conveyor 40. As each pocket arrives at the discharge end 28, the conveyor grippers 26 are activated to extend horizontally over each pocket 16 and retrieve an article 14 therefrom. When an article 14 arrives in a pocket 16 to the discharge end 28, the conveyor gripper 26 closes the jaws 90 around the exposed portion 14b of the article 14. At the same time the accompanying return conveyor gripper 26 is horizontally positioned over the return conveyor 38, and the associated jaws 90 are open to release a finished article 14 on the return conveyor 38 as shown in FIGS. 4 and 6. The controller then pivots the conveyor grippers 26 to a vertical position. If stationary and fixed pockets 16 of the first embodiment are used on the conveyor belt 18, then as the conveyor gripper 26 lifts the article 14 from the pocket 16, the bottom end portion 14a of the article 14 that was confined within the pocket 16 is slightly pivoted outwardly through one of the open spaces 54 as shown in FIG. 4. If the pocket is the pivoting or flexible pocket 16 of the second embodiment, then as the conveyor gripper 26 is pivoting upward with the article 14 from the delivery conveyor 40, the pocket 16 pivots about pivot edge 64 in the direction toward the conveyor gripper 26 as the conveyor gripper 26 retrieves the article 14 from the pocket 16. The pivotal motion of the pocket is limited by the bumper 86 on the stopper 84. When the article 14 is entirely out of the pocket 16, the spring 66 biases the pocket 16 back to the original upright position. Both embodiments of the pocket allow for uninhibited angular unloading of the article from the designated pockets. Once the conveyor grippers 16 are in the vertical position, the article 14 is accessible to the manufacturing machine 12 via the high speed gantry loader 34 and the associated gantry grippers 36. Although the discussion of the invention was illustrated with a horizontal conveyor path, the pockets and conveyor grippers as disclosed could be used with conveyor system 10 having a vertical or other angular conveyor path. The positions of the pockets and articles therein and the movement of the conveyor gripper will have the same angular positions and movements relative to the conveyor path as previously discussed.

The conveying system of the present invention with its specifically designed pockets allowing the articles in the pockets to be accessible to a pivoting gripper provides a cost efficient system having fewer moving parts than in previous conveyor systems. Further, the present invention eliminates the requirements of a piston and cylinder assembly. The present conveying system provides increased reliability, requires less maintenance and provides a cost efficient system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A conveying system for transporting a series of individual elongate articles from a first position to a second position, each article having at least one elongate side and opposing ends adjacent to the at least one elongate side, said conveying system comprising:
    a conveyor surface defining an endless path; and
    means for releasably securing the article by one of the opposing ends to the conveyor surface, wherein said at least one elongate side is essentially perpendicular to the conveyor surface.

2. The conveying system of claim 1 further comprising a conveyor gripper for removing the article from the conveyor surface by means of only a pivotal motion.

3. The conveying system of claim 1, wherein the means for releasably securing the article to the conveyor surface includes a pocket for each article fixedly connected to the surface, said pocket having a complementary configuration portion for releasably and securely receiving at least one article.

4. The conveying system of claim 3 wherein the pocket includes a base fixedly connected to the surface and a pair of arcuate portions extending outwardly from the base to define a discontinuous cylindrical configuration having open spaces between the arcuate portions for providing access for releasing the article from the pocket.

5. The conveying system of claim 4, wherein the article has a radially outwardly extending edge and the pocket has a groove along the inner periphery of the pocket for releasably and securely receiving the radially outwardly extending edge of the article.

6. The conveying system of claim 2, where the conveyor gripper includes jaws that selectively open and close around a portion of the article.

7. The conveying system of claim 3, wherein the pocket includes a base fixedly connected to the conveyor surface and a pivotal enclosure portion extending outwardly from the base, said enclosure portion having at least one edge pivotally connected to the base.

8. The conveying system of claim 7, wherein a stopper is fixedly positioned to one of the conveyor surface and the base and positioned adjacent to the pivotal enclosure portion for limiting the pivotal movement of the pocket.

9. The conveying system of claim 7, wherein the pivotal enclosure portion is biased by a spring to position the pivotal enclosure portion against the base.

10. The conveying system of claim 7, wherein the diametrically opposing edge of the pivotal enclosure portion includes an adjusting screw to adjust a return pivot of the enclosure portion.

11. The conveying system of claim 10, wherein the pivotal edge of the pivotal enclosure portion is positioned closer to an unloading gripper than the diametrically opposing edge.

12. The conveying system of claim 7, wherein the pivotal enclosure portion has an essentially cylindrical shape with a top rim.

13. The conveying system of claim 12, wherein the top rim is beveled.

14. The conveying system of claim 3, further comprising;
    a workstation for receiving the article to perform a machining operation;
    a conveyor gripper for unloading the article from the pocket on the conveyor surface and;
    a gantry gripper movable between the conveyor gripper and the workstation for transporting the article from the conveyor gripper to the workstation.

15. The conveying system of claim 14, wherein the gantry gripper is connected to a gantry, wherein said gantry is movable in horizontal and vertical directions.

16. The conveying system of claim 2 further comprising an article holding device configured for holding the article by one of the longitudinal ends, said article holding device having means for allowing angular unloading movement of the article from the article holding device.

17. The conveying system of claim 3 wherein the pocket includes a base fixedly connected to the conveyor surface and an enclosure portion extending outwardly from and fixedly secured to the base, said enclosure portion having an expanded area for allowing pivotal movement of the article when the conveyor gripper pivotally removes the article from the first position.

18. The conveying system of claim 10, wherein the adjusting screw is accessible from the bottom surface of the pocket.

19. A conveying system for transporting elongate articles having at least one longitudinal end, said conveying system comprising;
    a conveyor surface defining a path of travel between a first location and a second location;
    a flexible pocket connected to the conveyor surface for transporting articles in an upright position along the path of travel, the flexible pocket operably engageable with one longitudinal end of the article to be transported and
    the pocket having at least one side wall, and at least a portion of said at least one side wall moveable in response to removal of an article to be unloaded from the conveyor surface from the pocket.

* * * * *